United States Patent
Bowers

(10) Patent No.: US 6,476,120 B1
(45) Date of Patent: Nov. 5, 2002

(54) REFRIGERANT COMPOSITION CONTAINING PTFE

(76) Inventor: Anthony Dave Bowers, P.O. Box 2606, Sherman, TX (US) 75091

( * ) Notice: Subject to any disclaimer, the term of this patent is extended or adjusted under 35 U.S.C. 154(b) by 274 days.

(21) Appl. No.: 09/630,591

(22) Filed: Aug. 1, 2000

Related U.S. Application Data

(60) Provisional application No. 60/163,261, filed on Nov. 3, 1999.

(51) Int. Cl.$^7$ ................................................ C08L 27/18
(52) U.S. Cl. .................... 524/546; 252/68; 524/462; 524/463
(58) Field of Search .......................... 252/68; 524/546, 524/462, 463

(56) References Cited

U.S. PATENT DOCUMENTS

| | | |
|---|---|---|
| 4,487,707 A * | 12/1984 | Holzknecht et al. .......... 252/68 |
| 5,378,123 A | 1/1995 | Scuderi et al. |
| 5,440,919 A | 8/1995 | Cooper |
| 5,650,563 A | 7/1997 | Cooper et al. |
| 5,744,539 A | 4/1998 | McCoy et al. |
| 5,792,728 A | 8/1998 | Yuan et al. |

* cited by examiner

*Primary Examiner*—David W. Wu
*Assistant Examiner*—William K Cheung
(74) *Attorney, Agent, or Firm*—Richard C. Litman

(57) ABSTRACT

A refrigerant composition is disclosed which includes lubricants. The refrigerant composition includes formulations for use in automotive, residential or building air conditioning units. The refrigerant composition includes 25% to 35% by weight of a refrigerant, 60% to 70% by weight of a lubricating oil, and 0.5% to 10% by weight of polytetrafluoroethylene particles. The polytetrafluoroethylene particles range in size from 0.2 $\mu$m to 8.0 $\mu$m.

14 Claims, No Drawings

REFRIGERANT COMPOSITION CONTAINING PTFE

CROSS-REFERENCE TO RELATED APPLICATION

This application claims the benefit of U.S. Provisional Patent Application Serial No. 60/163,261, filed Nov. 3, 1999.

BACKGROUND OF THE INVENTION

1. Field of the Invention

The present invention relates to a refrigerant composition which includes lubricants for use in a refrigeration system.

2. Description of Related Art

Refrigerant fluids generally have powerful degreasing properties. Therefore, adequately lubricating the piston and cylinder walls and the bearings of the compressor used in cooling systems has heretofore presented a problem. In addition, there is the problem of adequately lubricating the moving parts of valves used in the cooling system. In past practice, an excess of lubricating oil was provided within the cooling system to provide some lubrication of the moving parts.

Examples of the application of PTFE particles can be seen among the references cited below. The McCoy et al. patent shows the use of PTFE particles in a lubricant composition intended primarily as an engine lubricant. The Holzknecht patent relates to a leak sealer for refrigeration systems. The leak sealer of Holzknecht relies on the agglomeration of PTFE particles to plug leaks, and therefore the particle sizes in the composition of Holzknecht are quite large.

None of the references cited below provide for a refrigerant composition which allows for the enhanced lubrication of parts within a cooling system. Therefore, the need persists in the art for a refrigerant composition which provides for enhanced lubrication of the parts of a cooling system.

U.S. Pat. No. 5,792,728, issued to Lin-Sen Yuan et al. on Aug. 11, 1998, is directed to a cutting fluid composition for use in machining operations. The cutting fluid composition includes molybdenum disulfide powder, soap flakes, a liquid PTFE suspension, and water. The liquid PTFE suspension used by Yuan et al. is composed of PTFE, water, and a surfactant. Yuan et al. do not disclose the range of PTFE particle sizes used in their composition.

U.S. Pat. No. 5,744,539, issued to Frederic C. McCoy et al. on Apr. 28, 1998, is directed to lubricant compositions having PTFE (a.k.a. TEFLON®) particles with an average size ranging from 4 to 6 microns dispersed therein. The compositions of McCoy et al. also include dispersing agents which help keep the TEFLON® particles from separating from the lubricating oil.

U.S. Pat. No. 5,650,563, issued to B. William Cooper et al. on Jul. 22, 1997, and U.S. Pat. No. 5,440,919, issued to B. William Cooper on Aug. 15, 1995, are directed to methods of introducing a leak detection dye into a refrigeration apparatus. The methods involve the placement of an inert dye impregnated carrier or the placement of a solid pellet of a dye in the desiccant bag of a dehydrator used in the refrigeration apparatus.

U.S. Pat. No. 5,378,123, issued to Carmelo J. Scuderi et al. on Jan. 3, 1995, is directed to an apparatus for recovering refrigerant from a refrigeration system. The apparatus includes a liquid trap which separates the gaseous refrigerant from the liquid refrigerant. The liquid refrigerant from the liquid trap goes to a liquid receiver, while the gaseous refrigerant is directed to a condenser where it is liquified and then directed to the same liquid receiver.

U.S. Pat. No. 4,487,707, issued to Robert H. Holzknecht on Dec. 11, 1984, is directed to a leak sealing composition for refrigeration systems. The composition of Holzknecht includes graphite or TEFLON® particles, ranging in size from 20 microns to 65 mesh, suspended in refrigeration oil.

None of the above inventions and patents, taken either singly or in combination, is seen to describe the instant invention as claimed.

SUMMARY OF THE INVENTION

The present invention is directed to a refrigerant composition which includes lubricants. The refrigerant composition of the present invention includes formulations for use in both automotive and residential or building air conditioning units. The refrigerant composition of the present invention includes 25% to 35% by weight of a refrigerant, 60% to 70% by weight of a lubricating oil, and 0.5% to 10% by weight of polytetrafluoroethylene particles. The polytetrafluoroethylene particles used in the present invention range in size from 0.2 μm to 8.0 μm.

Accordingly, it is a principal object of the invention to provide a refrigerant composition which allows the adequate lubrication of moving parts within a cooling system.

It is another object of the invention to provide a refrigerant composition which includes solid lubricating particles which will not be dissolved by the refrigerant component of the composition.

It is a further object of the invention to provide a refrigerant composition which includes PTFE particles.

Still another object of the invention is to provide a refrigerant composition which includes PTFE particles that are small enough to penetrate the interstices between the parts of a cooling system.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification.

DETAILED DESCRIPTION OF THE PREFERRED EMBODIMENTS

The present invention is directed to a refrigerant composition for use in a refrigeration system. In particular, the compositions of the present invention are suited for use in automotive and building cooling systems or air conditioning units. The refrigerant compositions of the present invention include 25.0% to 35.0% by weight of a refrigerant, 60.0% to 70.0% by weight of a lubricating oil, and 0.5% to 10.0% by weight of polytetrafluoroethylene (PTFE) particles. Refrigerant fluids generally have powerful degreasing properties. Therefore, adequately lubricating the piston, cylinder walls and the bearings of the compressor used in the cooling system has always presented a problem. In addition, there is the problem of adequately lubricating the moving parts of valves used in the cooling system. It has been found that including a combination of very fine PTFE particles and lubricating oil in the refrigerant fluid, greatly enhances the lubrication of moving parts within the cooling system.

The preferred refrigerants or refrigerant fluids for use in the present invention are tetrafluoroethane, chlorodifluoromethane, and chlorotrifluoromethane. An example of a suitable tetrafluoroethane is 1,1,1,2-tetrafluoroethane marketed by Dupont under the trade name SUVA® 134a. Chlorodifluoromethane and chlorotrifluoromethane are marketed by Dupont under the trade names FREON® 22 and FREON® 13, respectively.

The preferred lubricating oil for use in the compositions of the present invention is mineral oil sold under the product name SUNISO 3GS refrigeration oil. This mineral oil is distributed by Virginia KMP Corporation of Dallas, Tex. This mineral oil is a light golden liquid having a specific gravity of 0.9, and a boiling point of about 260° C.

The PTFE particles used in the present invention are marketed by Dupont under the designation ZONYL® MP 1100 fluoroadditive. ZONYL® MP 1100 is a white free-flowing powder made of PTFE particles. The primary particle size of the PTFE particles constituting the ZONYL® MP 1100 is 0.2 $\mu$m which agglomerate to give an average particle size of 150 $\mu$m in the powder as supplied by the manufacturer. When the powder is suspended in a liquid and subjected to shear stresses in a mixer, the agglomerates break down and the particle size most closely approaches the primary particle size of 0.2 $\mu$m. The compositions of the present invention are prepared by mixing the ingredients in a VITAMIX® mixer, an operation which subjects the agglomerates to shearing forces. Preferably the mixing should be carried out so as to subject the agglomerates to at least moderate shear. Moderate shearing forces will yield particle sizes which on average range from 0.2 $\mu$m to 8.0 $\mu$m. Most commonly, moderate shear yields a particle size distribution such that about 90.0% by volume of the polytetrafluoroethylene particles are smaller than about 8.0 $\mu$m in size. Even more preferably, the mixing conditions should be selected such that the agglomerates are subjected to high shearing forces such that the agglomerates break down to yield particles whose average size is in the range of 0.5 $\mu$m to 0.75 $\mu$m.

An example of a suitable refrigerant composition according to the present invention for automotive air conditioning systems is obtained by mixing about 66.0% by weight of lubricating oil, about 33.0% by weight of refrigerant, and about 1.0% by weight of the PTFE particles, under conditions of moderate to high shear. An example of a suitable refrigerant composition according to the present invention for building cooling or air conditioning systems is obtained by mixing about 66.0% by weight of lubricating oil, about 32.0% by weight of refrigerant, and about 2.0% by weight of the PTFE particles under conditions of moderate to high shear.

The refrigerant composition was tested on a home air conditioning system. With the air conditioning system charged with the refrigerant formulation described above for building airconditioning systems, as opposed to the standard refrigerant composition for the particular air conditioning system, the current drawn by the air conditioner compressor dropped by 10% for the same cooling effect, as indicated by an ammeter. Thus, the use of the refrigerant compositions of the present invention in cooling systems can result in substantial energy savings.

It is to be understood that the present invention is not limited to the embodiments described above, but encompasses any and all embodiments within the scope of the following claims.

I claim:
1. A refrigerant composition comprising:
   25.0% to 35.0% by weight of a refrigerant;
   60.0% to 70.0% by weight of a lubricating oil; and
   0.5% to 10.0% by weight of polytetrafluoroethylene particles.
2. The refrigerant composition according to claim 1, wherein said lubricating oil is present in the amount of about 66.0% by weight, said refrigerant is present in the amount of about 33.0% by weight, and said polytetrafluoroethylene particles are present in the amount of about 1.0% by weight.
3. The refrigerant composition according to claim 2, wherein said refrigerant is selected from the group consisting of 1,1,1,2-tetrafluoroethane, chlorodifluoromethane, and chlorotrifluoromethane.
4. The refrigerant composition according to claim 3, wherein said lubricating oil is mineral oil having a specific gravity of about 0.9.
5. The refrigerant composition according to claim 4, wherein said polytetrafluoroethylene particles range in average size from 0.2 $\mu$m to 8.0 $\mu$m.
6. The refrigerant composition according to claim 4, wherein said polytetrafluoroethylene particles have a size distribution such that about 90.0% by volume of said polytetrafluoroethylene particles are smaller than about 8.0 $\mu$m in size.
7. The refrigerant composition according to claim 1, wherein said lubricating oil is present in the amount of about 66.0% by weight, said refrigerant is present in the amount of about 32.0% by weight, and said polytetrafluoroethylene particles are present in the amount of about 2.0% by weight.
8. The refrigerant composition according to claim 7, wherein said refrigerant is selected from the group consisting of 1,1,1,2-tetrafluoroethane, chlorodifluoromethane, and chlorotrifluoromethane.
9. The refrigerant composition according to claim 8, wherein said lubricating oil is mineral oil having a specific gravity of about 0.9.
10. The refrigerant composition according to claim 9, wherein said polytetrafluoroethylene particles range in average size from 0.2 $\mu$m to 8.0 $\mu$m.
11. The refrigerant composition according to claim 9, wherein said polytetrafluoroethylene particles have a size distribution such that about 90.0% by volume of said polytetrafluoroethylene particles are smaller than about 8.0 $\mu$m in size.
12. The refrigerant composition according to claim 1, wherein said polytetrafluoroethylene particles range in average size from 0.2 $\mu$m to 8.0 $\mu$m.
13. The refrigerant composition according to claim 1, wherein said polytetrafluoroethylene particles have a size distribution such that about 90.0% by volume of said polytetrafluoroethylene particles are smaller than about 8.0 $\mu$m in size.
14. The refrigerant composition according to claim 1, wherein said polytetrafluoroethylene particles range in average size from 0.5 $\mu$m to 0.75 $\mu$m.

* * * * *